Aug. 19, 1930.  A. WASBAUER  1,773,699
THREE-SPEED CONSTANT MESH GEAR ELECTRIC MOTOR TRANSMISSION
Filed Jan. 4, 1928   2 Sheets-Sheet 1
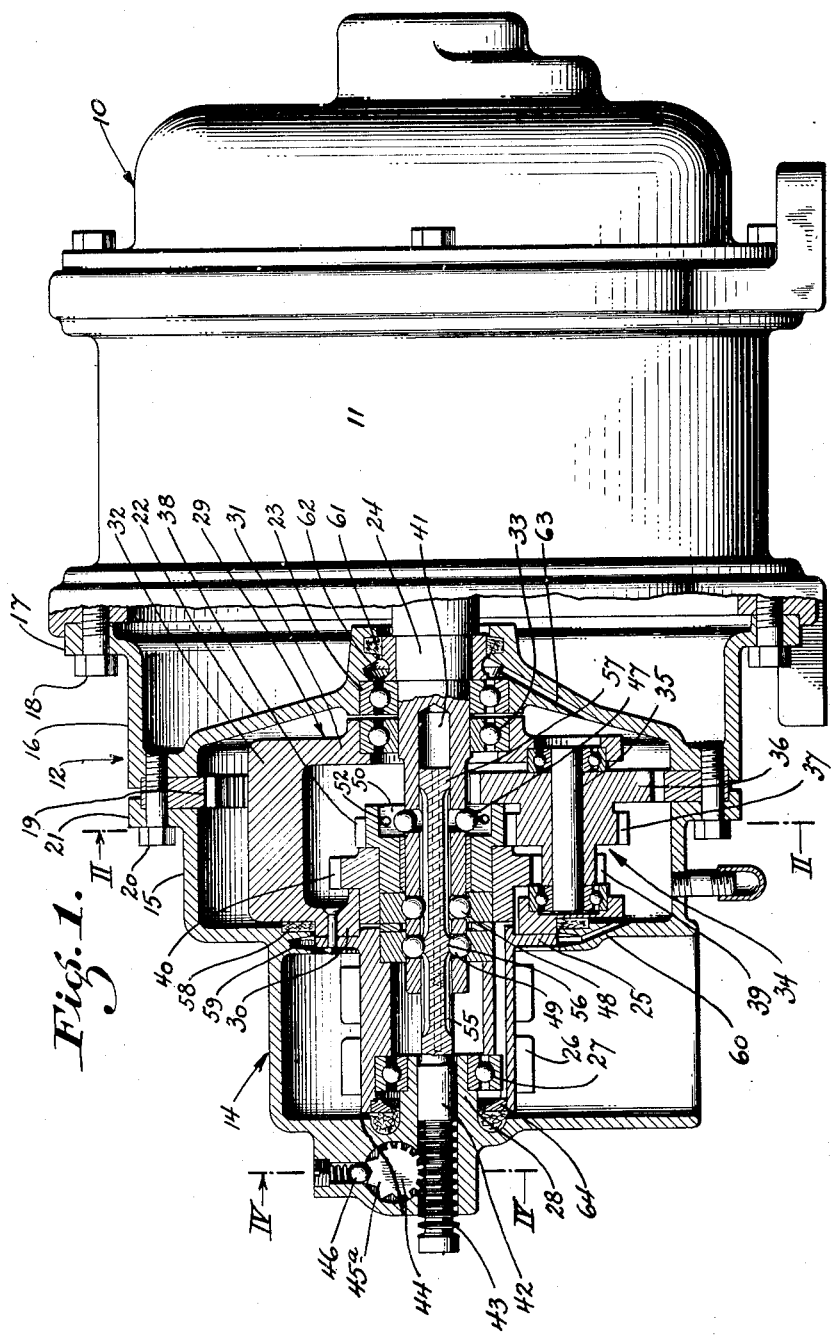
INVENTOR.
Alfred Wasbauer.
BY
Townsend, Loftus & Abbett
ATTORNEYS.

Aug. 19, 1930.  A. WASBAUER  1,773,699
THREE-SPEED CONSTANT MESH GEAR ELECTRIC MOTOR TRANSMISSION
Filed Jan. 4, 1928   2 Sheets-Sheet 2
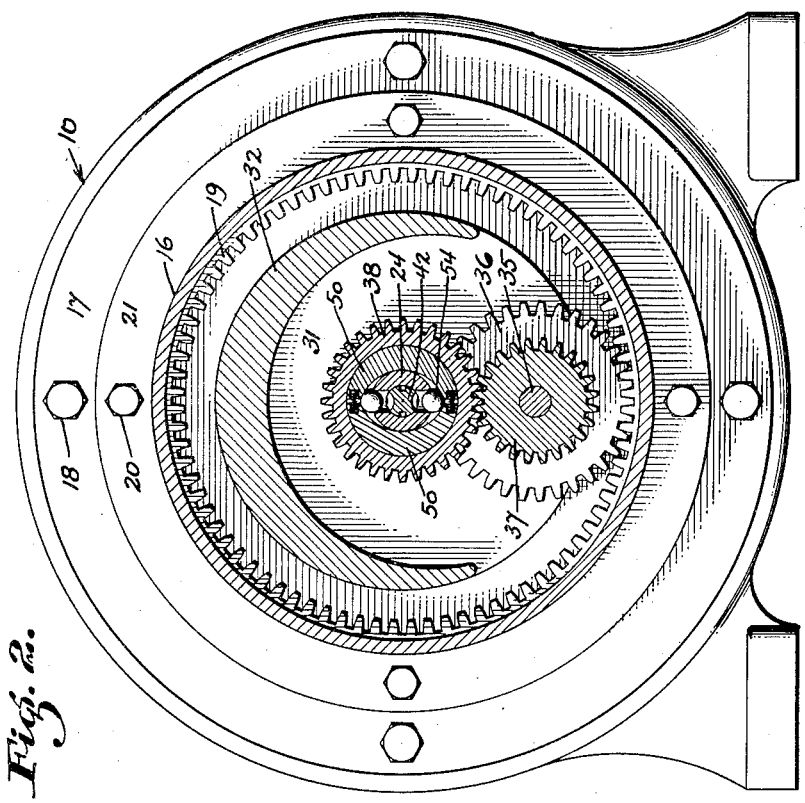
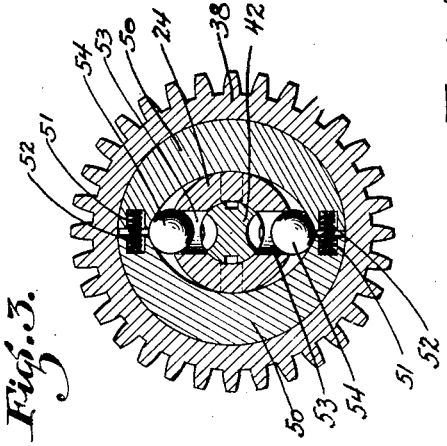
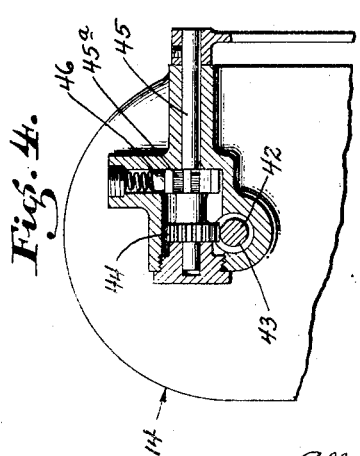
INVENTOR.
Alfred Wasbauer.
BY
ATTORNEYS.

Patented Aug. 19, 1930

1,773,699

UNITED STATES PATENT OFFICE

ALFRED WASBAUER, OF BERKELEY, CALIFORNIA, ASSIGNOR, BY MESNE ASSIGNMENTS, TO WISE PATENT AND DEVELOPMENT COMPANY, OF NEW YORK, N. Y., A CORPORATION OF DELAWARE

THREE-SPEED CONSTANT-MESH-GEAR ELECTRIC MOTOR TRANSMISSION

Application filed January 4, 1928. Serial No. 244,434.

This invention relates to transmissions and particularly pertains to a variable speed transmission for electric motors.

It is the principal object of the present invention to generally improve the construction and operation of transmissions of the character referred to by providing a transmission which may be directly assembled on the frame of a motor and wherein the transmission gears are in constant mesh but capable of being selectively placed in operation to drive the driving element of the transmission at various speeds while the motor speed remains constant.

In carrying out the invention in practice, my improved transmission is substituted on the motor frame in lieu of the usual end plate at the drive end of the motor shaft. Transmission gearing is associated with the motor shaft and with a driving element to drive the latter at different speeds relative to the motor shaft speed when the gear mechanism is placed in operation. The gears of the transmission remain in constant mesh because I have provided clutch means capable of selectively placing the gears in operation and create a drive connection between the motor shaft and driving element.

One form which the invention may assume is exemplified in the following description and illustrated by way of example in the accompanying drawings, in which:

Fig. 1 is a central vertical section through a transmission embodying the preferred form of my invention and disclosing it as assembled on an electric motor of standard design.

Fig. 2 is a transverse section through the transmission taken on line II—II of Fig. 1.

Fig. 3 is a transverse section through one of the gears on the motor shaft showing the construction of the clutch for clutching the gear to the motor shaft.

Fig. 4 is a view in section taken on line IV—IV of Fig. 1.

Referring more particularly to the accompanying drawings, 10 indicates an electric motor of any preferred design having the usual frame 11, upon which my improved transmission 12 is adapted to be assembled. The present transmission is so designed that it may be assembled on electric motors of standard design without altering the construction of the latter as it is only necessary to remove one end plate from the motor and substitute my improved transmission therefor.

The transmission mechanism 12 includes a hollow casing 14, the major portion of which is cylindrical. The casing 14 is formed in two rigidly connected sections 15 and 16. The section 16 is formed with a circumscribing radial flange 17 having bolt holes formed therethrough, which align with tapped holes in the end of the motor frame, so that cap screws 18 may be utilized to securely connect the transmission to the motor frame in proper alignment with the motor shaft.

At their contiguous faces the sections 15 and 16 of the casing 14 are circularly recessed to receive an internal ring gear 19. Cap screws 20 extend through a flange 21 on the section 15 through the internal ring gear and are threaded into the section 16 to securely connect the two sections of the casing together and to clamp the ring gear 19 in position properly centered relative to the motor shaft.

The section 16 of the casing is formed with a radial web 22 which is formed at its center with a bearing 23 receiving the motor shaft 24.

Arranged interiorly of the casing 14 is a combined driving element and spider 25. The driving element mentioned or that indicated by the numeral 26 may be either a sprocket gear to receive a driving chain or a pulley to receive a belt, and when I speak herein of driving elements, it should be interpreted to mean either a sprocket, pulley or equivalent driving medium.

The driving element 26 is hollow and cylindrical and is fitted with an anti-friction bearing 27 at its outer end arranged on a trunnion 28, projecting inwardly from the outer end of the transmission casing 14. The driving element and connected spider 29 are arranged concentrically of the motor shaft 24 as they are adapted to revolve with the motor shaft or about the same.

The spider 29 is formed of two spaced disks 30 and 31 which are integrally connected by a segmental counterweight 32. The disk 31 is fitted with an anti-friction bearing 33 arranged on the motor shaft 24 closely adjacent to the motor shaft bearing 23. The disk 30 of the spider is rigidly connected to the driving element 26 by a plurality of rivets or other connecting elements so that the spider and driving element are in reality one unit.

It is obvious from Fig. 1 that the element forming the driving element and spider is journalled at one end as described on the trunnion 28 of the transmission casing, and at its inner end on the motor shaft 24. This latter projects through the spider and within the driving element to a point short of the trunnion 28 of the transmission casing.

Arranged between the two disks 30 and 31 of the spider is a planet gear unit 34 having a spindle 35 journalled at its ends in the disks 30 and 31 eccentrically of the motor shaft 24. The planet gear unit is formed with a gear 36 in mesh with the ring gear 19, a gear 37 in mesh with a low speed gear 38 on the motor shaft and with a third gear 39 in mesh with a high speed gear 40 on the motor shaft.

I intend by the present construction to maintain all of the gears in the present transmission in constant mesh and to render different combinations effective to drive the driving element 26 at selected speeds relatively different from that of the motor. In the present instance I have shown means for driving the driving element 26 at three different speeds while the speed of the motor remains constant. One of these speeds is a direct drive wherein the driving element 26 is directly connected to the motor shaft, so that the driving element will revolve at motor speed. The other two driving connections are such as to drive the driving element as speeds different than motor speed.

I accomplish this by forming a bore 41 extending within the end of the motor shaft 24. A control shaft 42 projects within this bore in the end of the motor shaft. The outer end of this control shaft 42 is formed with circular rack teeth 43 and is guided within a bore extending through the trunnion 28 of the transmission casing. A pinion 44 is in mesh with the rack teeth 43 on the control shaft 42, which pinion may be revolved by a shaft 45 to reciprocate the control shaft 42 within the end of the motor shaft 24.

The shaft 45 is formed with spaced notches 45ª which cooperate with a spring-pressed ball 46 in yieldably retaining the control shaft in different positions.

The control shaft 42 is adapted to operate three clutches, or those indicated by the numerals 47, 48 and 49 in Fig. 1. The clutch 47 is operative to clutch the low speed gear to the motor shaft 24 and the clutch 48 is adapted to clutch the high speed gear 40 to the motor shaft 24, while the clutch 49 is adapted to directly connect the driving element and spider to the motor shaft. In construction and operation all three clutches are exactly the same so that I will describe the construction and operation of but one clutch.

Reference being had to Fig. 3, wherein I have shown a transverse section through a clutching member, it will be seen that the gear 38 is counterbored at one end to receive a pair of semi-circular clutch shoes 50, the exterior surface of which are turned so as to be snugly received within the counterbore of the gear. The ends of these shoes, however, are cut-away so that they do not contact when inserted in the counterbore. Sockets 51 are formed transversely within the ends of the shoes to receive transversely disposed springs 52 which tend to maintain the exterior surface of the shoes in frictional contact with the gear 38, so that the clutch shoes will normally revolve in unison with the gear.

The clutch shoes are elliptically bored as shown in Fig. 3, the minor axis of which elliptical bore is substantially the same as the diameter of the motor shaft 24, which extends through the gear 38. This motor shaft is formed with radial pockets 53 extending outwardly from the bore in the motor shaft. These pockets receive clutch members or balls 54. In alignment with these pockets the control shaft 42 is formed with aligned longitudinal grooves 55. These grooves are on diametrically opposed sides of the control shaft as are the pockets 53. The control shaft 42 is held from rotation with respect to the motor shaft 24, so that the grooves 55 and the pockets 53 are always maintained in alignment.

It will be noticed that the grooves 55 are interrupted by high points on the control shaft, which high points are at substantially the outer periphery of the control shaft so that when the control shaft 42 is moved axially with respect to the motor shaft, the clutch balls will be moved outwardly when engaged by these high points. I have indicated these high points by the numerals 56 and 57 in Fig. 1.

From this figure it will be noticed that when the control shaft 42 is moved outwardly, the high point 57 will force the balls of the clutch 47 outwardly and engage this clutch, while the high point 56 by reciprocating the control shaft may cause engagement of either of the clutches 48 and 49.

When the grooves of the control shaft are in alignment with the balls of the clutch, the balls may reciprocate radially of the shaft and freely follow the elliptical path formed by the elliptical bore of the clutch shoes 50.

When the control shaft is shifted to engage its high point with the balls, the balls are held outwardly so that they can only partially ride around the elliptical bore within the clutch shoes, and if torque is applied to the shaft, the action will be that the balls will tend to spread the clutch shoes 50 and force them outwardly into tight frictional engagement with the gear. The greater resistance to rotation of the gear, the greater the outward pressure will be exerted by the balls in trying to pass through the elliptical path. Thus, a perfect clutching action will be provided to connect the gear or element with which the clutch is associated to the motor shaft 24.

I desire to point out here that in the present clutch, all wear occurring will be automatically taken up, due to the fact that as the wear occurs the greater amount of relative movement will occur between the shaft and the clutch shoes prior to complete engagement of the clutch.

It is believed that the description has been sufficiently clear to point out that by shifting the control shaft 42 longitudinally, either of the clutches 47, 48 and 49 may be engaged to clutch either of the gears 38 and 40 to the motor shaft or to directly connect the driving element and spider to the motor shaft.

I intend that the entire gear structure be run in lubricant, and to accomplish this the combined driving element and spider is shouldered at the point where it extends outwardly from the cylindrical portion of the transmission casing. At this point, I provide a felt ring 58 to prevent the lubricant from escaping from within the cylindrical portion of the transmission casing. Just outwardly from this felt ring I provide a circular groove 59 in the wall of the casing surrounding the shoulder mentioned to collect the escaping lubricant and direct it back into the cylindrical portion of the casing through a passageway 60.

At the opposite end of the cylindrical portion of the transmission casing I fit the bearing 23 with a felt ring 61. Intermediate the anti-friction bearing and this felt ring 61 the bearing structure is formed with a groove 62 to collect the lubricant passing through the anti-friction bearing and to deliver it back into the casing through a passageway 63.

To prevent lubricant from passing entirely through the spider and driving element 26, a seal 64 is provided between the end of the driving element 26 and the end of the transmission casing surrounding the trunnion 28. Thus, the lubricant will be held entrapped within the cylindrical portion of the casing 14 and within the driving element 26, but at the same time will have access to all of the wearing surfaces in need of lubrication.

I desire to call attention to the fact that the outer end of the transmission casing, which projects beyond the cylindrical portion thereof, is open at its bottom so that a belt or a driving chain may be connected to the driving element.

In operation of the device, a transmission is constructed and assembled as shown in the drawings and the casing thereof is securely bolted to the frame 11 of an electric motor. The control shaft 42 is shifted so that the balls of all three clutches 47, 48 and 49 are in register with the longitudinal grooves in the control shaft, so that all three clutches will be disengaged and the gears and elements associated therewith disengaged from the motor shaft 24.

Should it be desired to drive the driving element at the same speed as the motor, the control shaft 42 is shifted by means of the shaft 45 to align its high point 56 with the balls of the clutch 49. This, as previously described, will cause engagement of the clutch and will directly connect the driving element 26 to the motor shaft 24. This connection will cause the driving element and spider to revolve in unison with the motor shaft 24, the planet gear 36 riding freely around the ring gear 19.

Should it be desired to change speed, the control shaft 42 is shifted to place its high point 56 into register with the balls of the clutch 48. Such shifting of the control shaft will cause the clutch 48 to clutch the high speed gear 40 to the motor shaft. This gear 40 will drive the planet gear unit through the gear 39 thereon, causing the gear 36 of the planet unit to ride about the ring gear 19. As the planet gear unit is connected to the spider, the driving of the gear 36 around the stationary ring gear will cause the driving element 26 and spider to revolve around the motor shaft in the same direction as the latter but at a relatively different speed.

A third speed may be obtained by shifting the control shaft 42 to bring the high point 57 of the control shaft into register with the balls of the clutch 47. Such operation will clutch the low speed gear 38 to the motor shaft which will drive the planet gear unit through the gear 37. This will drive the gear 36 causing it to travel around the ring gear 19, driving the spider and its connected driving element 26 in the same direction as the motor shaft 24 but at a relatively different rate of speed.

I desire to point out here that the spider is counterweighted by the counterweight 32 to offset the weight of the planet gear unit, so that the structure will be perfectly balanced about the axis of the motor shaft.

From the foregoing it is obvious that I have provided a simple and compact transmission for electric motors which is ideally adapted for use in driving machine tools and similar devices, and wherein the gears will remain in constant mesh but may be selectively placed in operation so that the driving element may be driven at selected speeds.

It is obvious that the transmission here disclosed may be constructed so that more than three speeds of the driving element may be obtained. To accomplish this, it is only necessary to provide additional intermediate gears on the motor shaft and increase the number of gears on the planet unit accordingly, and thus a greater number of drives may be obtained, all of which may be controlled by the control shaft 42.

While I have shown the preferred form of my invention, it is to be understood that various changes may be made in its construction by those skilled in the art without departing from the spirit of the invention, as defined in the appended claims.

Having thus described my invention, what I claim and desire to secure by Letters Patent is:

1. A motor transmission including a casing, a power shaft extending into the casing, a driving element rotatably supported concentric to the power shaft, an internal gear fixed to the casing and concentric with the power shaft, a planet gear carried by the driving element in mesh with the said internal gear, gears of different diameters loosely arranged on the power shaft, gears of different diameters rigid with the planet gear and in mesh with the gears of the power shaft, and means for connecting either of the gears on the power shaft to the latter.

2. A motor transmission including a casing, a power shaft extending into the casing, a driving element rotatably supported concentric to the power shaft, an internal gear fixed to the casing and arranged concentric with the power shaft, a planet gear carried by the driving element and meshing with said internal gear, gears of different diameters loosely arranged on the power shaft, gears of different diameters rigid with the planet gear and meshing with the gears of the power shaft, and operative means for connecting the driving element directly to the power shaft and for connecting either of the gears on the power shaft to the latter to drive the planet gear.

3. A motor transmission including a casing, a power shaft extending into the casing, a driving element arranged concentric with the power shaft and supported at one end thereby, the other end of said driving element being supported by the casing, an internal gear fixed to the casing and arranged concentric with the power shaft, a planet gear carried by the driving element and meshing with the internal gearing, gears of different diameters loosely arranged on the power shaft, gears of different diameters rigid with the planet gear and meshing with the gears on the power shaft, and clutch means associated with the power shaft and with the gears thereon and capable of selective operation to connect either of the gears to the power shaft.

4. A motor transmission including a casing, a power shaft extending into the casing a driving element arranged concentric with the power shaft and supported at one end thereby, the other end of said driving element being supported by the casing, an internal gear fixed to the casing and arranged concentric with the power shaft, a planet gear carried by the driving element and meshing with said internal gear, gears of different diameters arranged on the power shaft, gears of different diameters rigid with the planet gear and meshing with the gears of the power shaft, and clutch means associated with the power shaft and with the driving element and with the gears on the power shaft, said clutch means being capable of selective operation to clutch either of the gears or the driving element to the power shaft.

5. A motor transmission including a transmission casing having an oil-tight chamber, a power shaft projecting into the oil-tight chamber of the casing, a driving element arranged exteriorly of said chamber and concentric with the power shaft and supported at its end by the casing, a spider fixed to the said driving element and arranged within said chamber and journaled at its end on the power shaft, an internal gear arranged concentric with the power shaft and fixed to the casing, gears of different diameters loosely arranged on the power shaft, gears of different diameters rigid with said planet gear and meshing with the gears on the power shaft, and means for selectively connecting said gears on the power shaft to the latter to drive the planet gear at different speeds.

6. A motor transmission including a casing, a power shaft extending into the casing, a driving element arranged concentric with the power shaft and supported at one end by the same, the other end of said driving element being suported by the casing, an internal gear fixed to the casing and arranged concentric with the power shaft, a planet gear carried by the driving element and meshing with said internal gear, gears of different diameters arranged on the power shaft, gears of different diameters rigid with the planet gear and meshing with the gears on the power shaft, clutch means associated with the power shaft and with the gears thereon and capable of selective operation to connect either of the gears of the power shaft to the latter to drive the planet gear at different speeds, said clutch means comprising expanding clutch elements interposed between the power shaft and the gears, and means operative from the exterior of the casing for expanding said clutch elements.

7. A motor transmission including a casing, a power shaft extending into the casing, a driving element arranged concentric with the power shaft and supported at one end by the same, the other end of said driving element being supported by the casing, an internal gear fixed to the casing and arranged concentric with the power shaft, a planet gear carried by the driving element and meshing with the said internal gear, gears of different diameters loosely arranged on the power shaft, gears of different diameters relatively fixed to the planet gear and in mesh with the gears on the power shaft, clutch means associated with the power shaft and with the gears thereon and capable of selective operation to connect either of the gears to the power shaft to drive the planet gear, said clutch means comprising radially expansible clutch elements interposed between said gears and the power shaft, balls carried by the power shaft in alignment with said expansible elements and normally disposed within the periphery of the power shaft, and operative means for projecting said balls beyond the periphery of the power shaft to expand said expansible elements and effect a clutching action.

8. A motor transmission including a casing, a power shaft extending into the casing, a driving element arranged concentric with the power shaft and supported at one end by the same, the other end of said driving element being supported by the casing, an internal gear fixed to the casing and arranged concentric with the power shaft, a planet gear carried by the driving element and meshing with the internal gear, gears of different diameters loosely arranged on the power shaft, gears of different diameters rigid with the planet gear and meshing with the gears of the power shaft, clutch means associated with the power shaft and with the gears thereon and capable of selective operation to connect either of the gears on the power shaft to the latter to drive the planet gear at different speeds, said clutch means comprising radially expansible clutch elements interposed between the gears and the power shaft, balls carried by the power shaft in alignment with said expansible elements and normally disposed within the periphery of the power shaft, and a control shaft extending within the power shaft and capable of reciprocation, said control shaft having means for projecting said balls from the power shaft when aligned with the balls to engage said clutch means.

9. A motor transmission including a casing, a power shaft extending into the casing, a driving element arranged concentric with the power shaft and supported at one end by the same, the other end of said driving element being supported by the casing, an internal gear fixed to the casing and arranged concentric with the power shaft, a planet gear carried by the driving element and meshing with the internal gear, gears of different diameters loosely arranged on the power shaft, gears of different diameters rigid with the planet gear and meshing with the gears of the power shaft, clutch means associated with the power shaft and with the gears thereon and capable of selective operation to connect either of the gears on the power shaft to the latter to drive the planet gear at different speeds, said clutch means comprising radially expansible clutch elements interposed between the gears and the power shaft, balls carried by the power shaft in alignment with said expansible elements and normally disposed within the periphery of the power shaft, a control shaft mounted for reciprocation within the power shaft and provided with means to project said balls from the power shaft, said control shaft being provided with circular rack teeth, and an operating shaft having a pinion meshing with the circular rack teeth and adapted to be rotated to reciprocate the control shaft.

10. A motor transmission including a casing, a power shaft extending into the casing, a driving element arranged concentric with the power shaft and supported at one end by the same, the other end of said driving element being supported by the casing, an internal gear fixed to the casing and arranged concentric with the power shaft, a planet gear carried by the driving element and meshing with the internal gear, gears of different diameters loosely arranged on the power shaft, gears of different diameters rigid with the planet gear and meshing with the gears of the power shaft, clutch means associated with the power shaft and with the gears thereon and capable of selective operation to connect either of the gears on the power shaft to the latter to drive the planet gear at different speeds, said clutch means comprising radially expansible clutch elements interposed between the gears and the power shaft, balls carried by the power shaft in alignment with said expansible elements and normally disposed within the periphery of the power shaft, a control shaft mounted for reciprocation within the power shaft and provided with means to project said balls from the power shaft, said control shaft being provided with circular rack teeth, an operating shaft having a pinion meshing with the circular rack teeth and adapted to be rotated to reciprocate the control shaft, a toothed member carried by the operating shaft, and means coacting with the toothed member for automatically holding the operating shaft against accidental movement and adapted also to automatically release the operating shaft when pressure is applied thereto.

11. A motor transmission including a casing composed of cylindrical sections having contiguous portions circularly recessed and secured together, a power shaft extending into the casing, a driving element arranged concentric with the power shaft and supported at one end by the same, an internal gear arranged in the circularly recessed portions of the said sections and held by the latter, a planet gear carried by the driving element and meshing with the said internal gear, gears of different diameters loosely arranged on the power shaft, gears of different diameters rigid with the planet gear and meshing with the gears of the power shaft, and means for connecting either of the gears of the power shaft with the latter.

ALFRED WASBAUER.